(12) United States Patent
Jakubowski, Jr. et al.

(10) Patent No.: US 7,648,104 B1
(45) Date of Patent: Jan. 19, 2010

(54) STORE EJECTOR RACK

(75) Inventors: Thaddeus Jakubowski, Jr., St. Charles, MO (US); John K. Foster, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 457 days.

(21) Appl. No.: 11/453,413

(22) Filed: Jun. 15, 2006

(51) Int. Cl.
*B64D 1/02* (2006.01)
(52) U.S. Cl. ..................... 244/137.4; 89/1.53
(58) Field of Classification Search .............. 244/137.4, 244/136, 137.1; 294/82.26; 248/500, 351, 248/354.4, 354.3; 89/1.53, 37.16, 37.17, 89/37.19, 1.54, 1.58, 1.59
See application file for complete search history.

(56) References Cited

U.S. PATENT DOCUMENTS

| | | | |
|---|---|---|---|
| 2,776,570 A * | 1/1957 | Nelson et al. ............. 74/2 |
| 4,168,046 A * | 9/1979 | Hasquenoph et al. .... 244/137.4 |
| 4,183,777 A | 1/1980 | Summers et al. |
| 4,346,642 A * | 8/1982 | Uhle .......................... 89/1.53 |
| 4,440,365 A * | 4/1984 | Holtrop ................... 244/137.4 |
| 4,543,873 A * | 10/1985 | Stock .......................... 89/1.59 |
| 4,616,793 A * | 10/1986 | Hassler, Jr. ............... 244/137.4 |
| 5,406,876 A * | 4/1995 | Harless et al. ................ 89/1.54 |
| 5,583,312 A | 12/1996 | Jakubowski, Jr. |
| 5,915,290 A * | 6/1999 | Coleman et al. ............. 89/1.59 |
| 5,932,829 A * | 8/1999 | Jakubowski, Jr. ........ 244/137.4 |
| 6,119,982 A * | 9/2000 | Jakubowski, Jr. et al. 244/137.4 |
| 6,250,195 B1 * | 6/2001 | Mendoza et al. ......... 244/137.4 |

\* cited by examiner

*Primary Examiner*—Michael R Mansen
*Assistant Examiner*—Richard R Green

(57) ABSTRACT

A store ejection system that can be "blind-loaded" without the need to have physical access to the ejector rack. This invention provides the ability to carry certain unique weapon shapes that can not be carried on current ejector racks due to the lack of access to the rack once the weapon is raised into position.

10 Claims, 13 Drawing Sheets

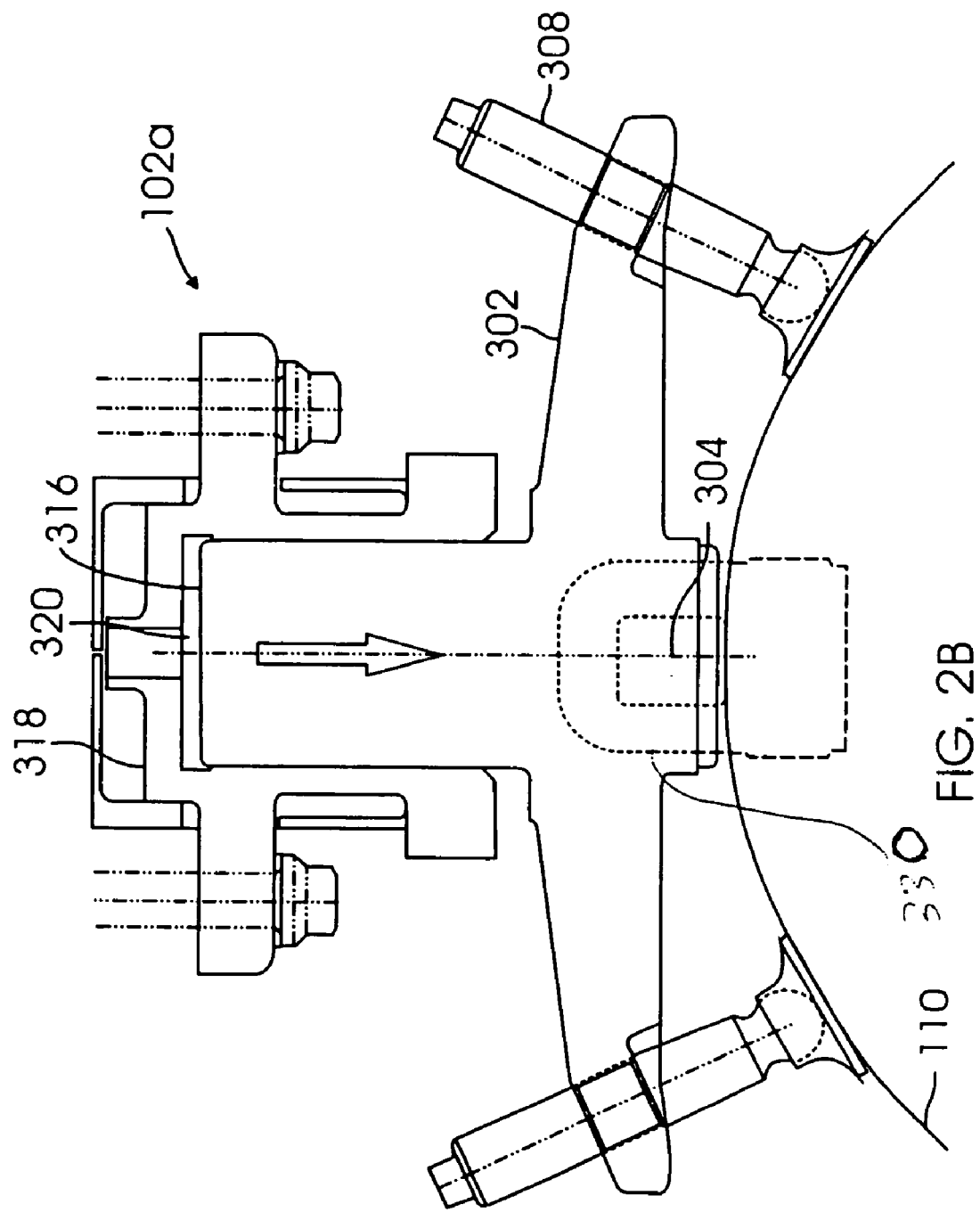

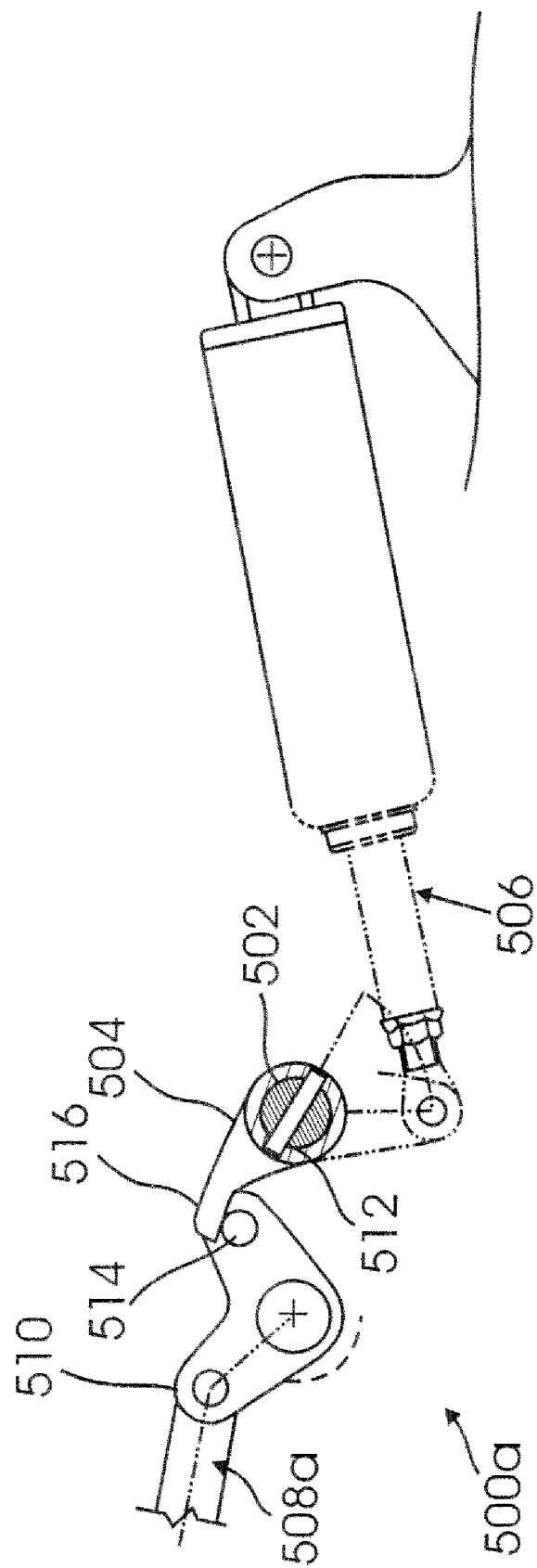

STORE EJECTOR RACK

BACKGROUND

1. Field of the Invention

This invention relates generally to store carriers for mounting a releasable store on an aircraft and, more particularly, to a store ejection system capable of ejecting stores of various size and shapes.

2. Background of the Invention

The store referred to herein may be used to contain munitions, or to contain other material to be dropped from an aircraft. Military aircraft used to dispense bombs, rockets, and other stores in flight usually include racks located beneath the wings and fuselage, or in weapon bays designed to release the stores upon command.

At the time of target acquisition, a release mechanism is activated which results in mechanical release and subsequent forcible ejection of that weapon away from the aircraft. Presently, most state of the art bomb ejector racks utilize pyrotechnic (explosive) cartridges which, on ignition, generate high pressure gas for actuating the mechanical release mechanism, as well as for providing high pressure to ejection rams which forcibly eject the store from the aircraft.

Many new stores being developed can not be carried on conventional stores ejection systems because these weapons typically have fins, strakes, or protrusions that may hide or blanket access to the ejector rack once the store is raised into position, especially in weapon bays where access is limited.

Current bomb ejector racks require direct access during the store loading process so that cartridges can be inserted, swaybraces can be tightened, and safety pins can be installed and/or removed. New generation weapon designs have larger fins as compared to previous weapon. Also, newer aircraft are being designed with smaller weapon bays. This combination results in minimal, to no, access being available to physically reach the bomb ejector rack. Loading of weapons has become cumbersome and time consuming. In some cases, the ability to carry certain types of weapons has been lost.

Accordingly, what is needed is a stores ejection system for mounting jettisonable stores on an aircraft, where access to the stores ejection system is not required.

SUMMARY OF THE INVENTION

The present invention provides a stores ejection system that can be "blind-loaded" without the need to have physical access to the ejector rack.

The invention provides the ability to carry certain unique weapon shapes that can not be carried on current ejector racks due to the lack of access to the rack once the weapon is raised into position. The present invention incorporates a pneumatic ejection system which eliminates the need for using pyrotechnic cartridges. Moreover, the present invention allows for non-manual tightening of swaybrace arms and eliminates the need to install and remove safety pins.

In one aspect of the invention, a stores ejection system is provided including an adjustable swaybrace configured to be moved between a free hanging position and a store secure position; and a tightening screw for containing movement of the store when the adjustable swaybrace is in the store secure position.

In another aspect of the invention, a stores ejection system is provided including an adjustable swaybrace configured to be moved between a free hanging position and a store secure position; a tightening screw for containing movement of the store when the adjustable swaybrace is in the store secure position; and a hook opening mechanism which secures the store when the adjustable swaybrace is in the store secure position.

In yet another aspect of the invention, a method is provided for mounting a store to an aircraft using a store ejection system. The method includes hoisting a store into contact with a swaybrace; moving the swaybrace between a free hanging position and a store secure position using en electro-mechanical actuation device; and adjusting a tightening screw for containing movement of the store when the swaybrace is in the store secure position.

In one aspect of the invention, all functions of the ejection system may be operated from a remote control panel.

Additional advantages, objects, and features of the invention will be set forth in part in the detailed description which follows. It is to be understood that both the foregoing general description and the following detailed description are merely exemplary of the invention, and are intended to provide an overview or framework for understanding the nature and character of the invention as it is claimed.

BRIEF DESCRIPTION OF THE DRAWINGS

The accompanying drawings are included to provide further understanding of the invention, illustrate various embodiments of the invention, and together with the description serve to explain the principles and operation of the invention. In the drawings, the same components have the same reference numerals. The illustrated embodiment is intended to illustrate, but not to limit the invention. The drawings include the following Figures:

FIGS. 2A and 2B are simplified illustrations of a swaybrace structure in accordance with an embodiment of the present invention;

FIGS. 5A and 5B are simplified illustrations of components of forward and aft release systems in accordance with an embodiment of the present invention.

DETAILED DESCRIPTION OF THE PREFERRED EMBODIMENTS

Figure 1:
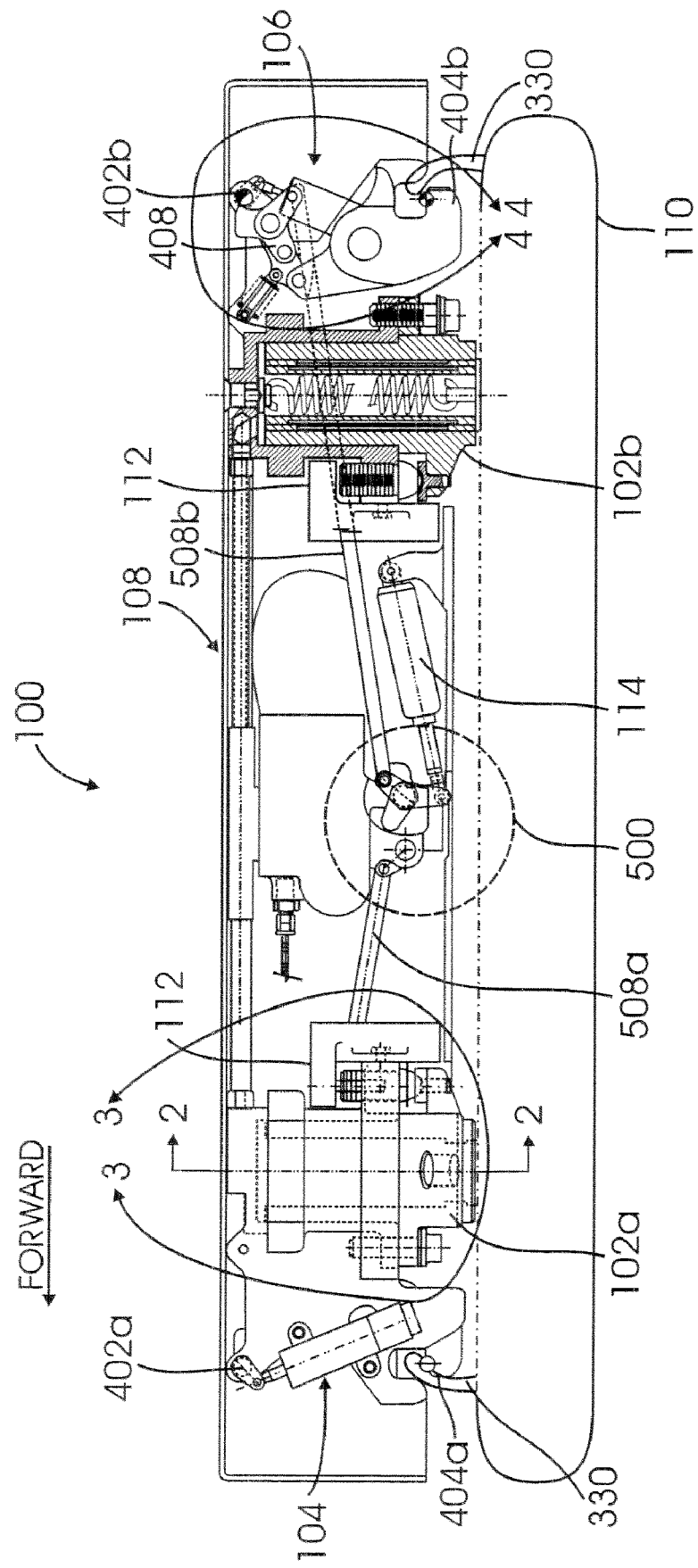
FIG. 1 is a simplified cross sectional view of an internal arrangement of a weapon ejector rack in accordance with an embodiment of the present invention.

FIG. 1 is a simplified cross sectional view of an internal arrangement of a weapon ejector rack 100 in accordance with an embodiment of the present invention. As shown in FIG. 1, the internal components of ejector rack 100 include fore and aft swaybrace structures ("structures") 102*a* and 102*b* (swaybrace structure 102*b* shown in cut-away cross-section), electro-mechanical actuators 112, safety lock mechanisms 104 and 106 (shown in left and right side views, respectively) and manual release motor 114. Each of these components has been designed to operate using an integration of electro-mechanical devices to drive the presently manually driven systems.

A pneumatic ejection system 108 is included in ejector rack 100 to provide energy for forcible ejection of store 110.

As previously discussed, most weapon ejection systems now use pyrotechnic cartridges to provide energy for forcible ejection. Pneumatic ejection system 108 eliminates the need for using pyrotechnic cartridges. Instead, energy for forcible ejection is provided by high pressure air which is generated from an on-board compressor. In one embodiment, pressurization is automatic upon application of aircraft power to the ejector rack. An operational embodiment of an exemplary pneumatic ejection system is described in U.S. Pat. No. 5,583,312, which is herein incorporated by reference for all purposes.

Figure 2A:
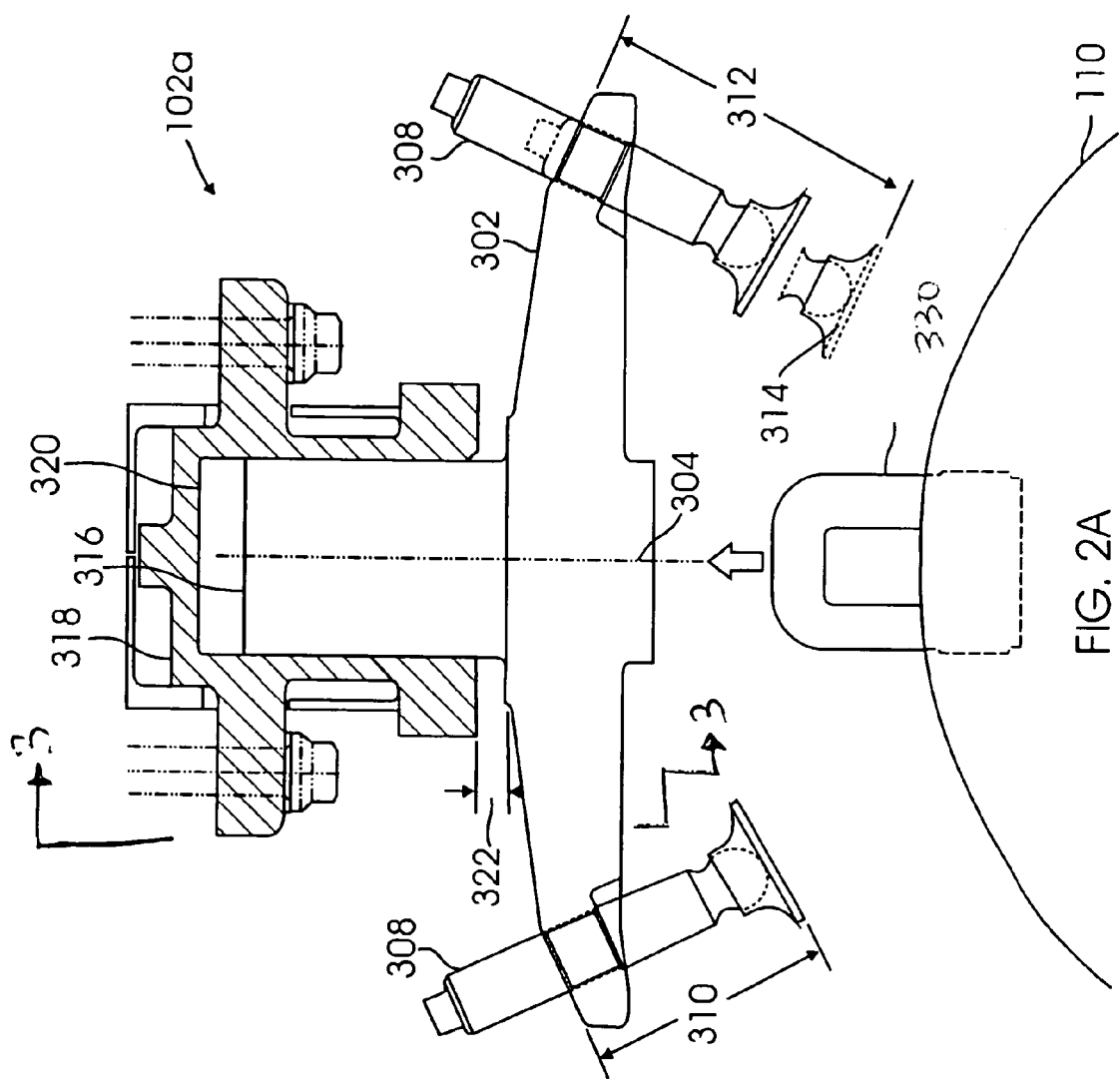

FIGS. 2A and 2B illustrate cross-sectional end views of ejector rack 100 further illustrating an embodiment of forward swaybrace structure 102a before and after store loading. It should be understood that swaybrace structure 102b is identical to swaybrace structure 102a. Swaybrace structure 102a includes swaybrace arms 302 that extend out substantially perpendicular from a swaybrace column 316 at about the center of swaybrace arms 302. Each swaybrace arm 302 further includes a tightening screw 308, which is used to position store 110 and counter movement of store 110.

In one embodiment, since store 110 typically has a substantially round shape, tightening screw 308 may be mounted at an angle to centerline 304 of ejector rack 100. The angled positioning of tightening screw 308 allows the tightening screw to be directed toward the center of store 110. In this manner, mounting pads 314 may make flush contact with store 110 when store 110 is raised into position. In addition, each mounting pad 314 may include the ability to swivel to further ensure that tightening screw 308 approximates a flush contact onto store 110.

In one embodiment tightening screw 308 is adjustable between a full-up position 310 and a full-down position 312. Accordingly, depending on the type of store 110 to be mounted, tightening screw 308 may be adjusted to accept a given store 110 diameter. For example, if store 110 has a 16 inch diameter, then tightening screws 308 may be adjusted such that each mounting pad 314 contacts the surface of store 110 in a flush manner.

Swaybrace structure 102a also includes a structural housing 318 which defines a bore 320 that is positioned along centerline 304 of ejector rack 100. Bore 320 is configured to receive column 316 within housing 318. Thus, in one embodiment, column 316 may be moved in and out from housing 318 allowing swaybrace arm 302 to be moved vertically along centerline 304 a variable distance represented at 322.

Figure 3:
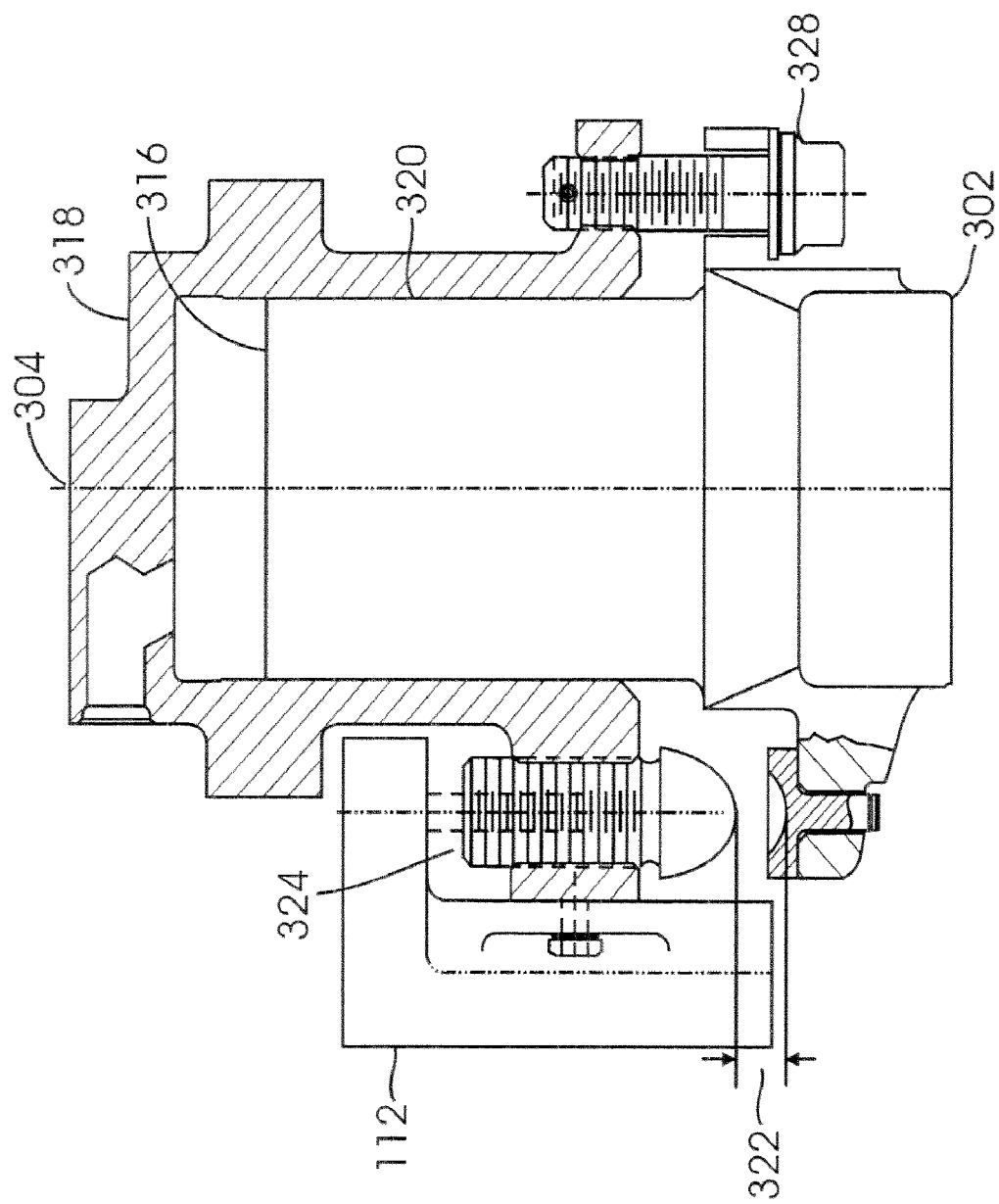
FIG. 3 is a simplified cross sectional view of a swaybrace arm tightening mechanism in accordance with an embodiment of the present invention.

In operation, as illustrated in FIG. 2A, column 316 may be placed in a hanging free position prior to the loading of store 110. As shown in FIG. 3, a swaybrace downstop 328 may be used to limit the "free hanging" travel of column 316 out from bore 320 when store 110 is not present.

Referring to FIG. 2B, store 110 is hoisted upward using ground equipment (not shown) that lifts store 110 upward to contact tightening screws 308. As store 110 continues to be hoisted, column 316 moves upward into housing bore 320 until suspension hooks 404a and 404b, shown in FIG. 1, engage and close around a complimentary attachment feature 330 located on store 110 to secure store 110 to ejector rack 100. Once suspension hooks 404a and 404b are closed, the ground equipment can be removed allowing the weight of store 110 to be supported by suspension hooks 404a and 404b.

In one embodiment, as shown in FIGS. 2B and 3, an electro-mechanical actuator 112 is used to rotate a threaded member 324, which acts like a screw jack, to tighten swaybrace arm 302 down against store 110 to secure store 110 from moving. Electro-mechanical actuator 112 may be any suitable motor, for example, a high torque gear drive motor. Once a particular tightening load is reached, motor 112 is stopped and store 110 is secure.

Figure 4A:
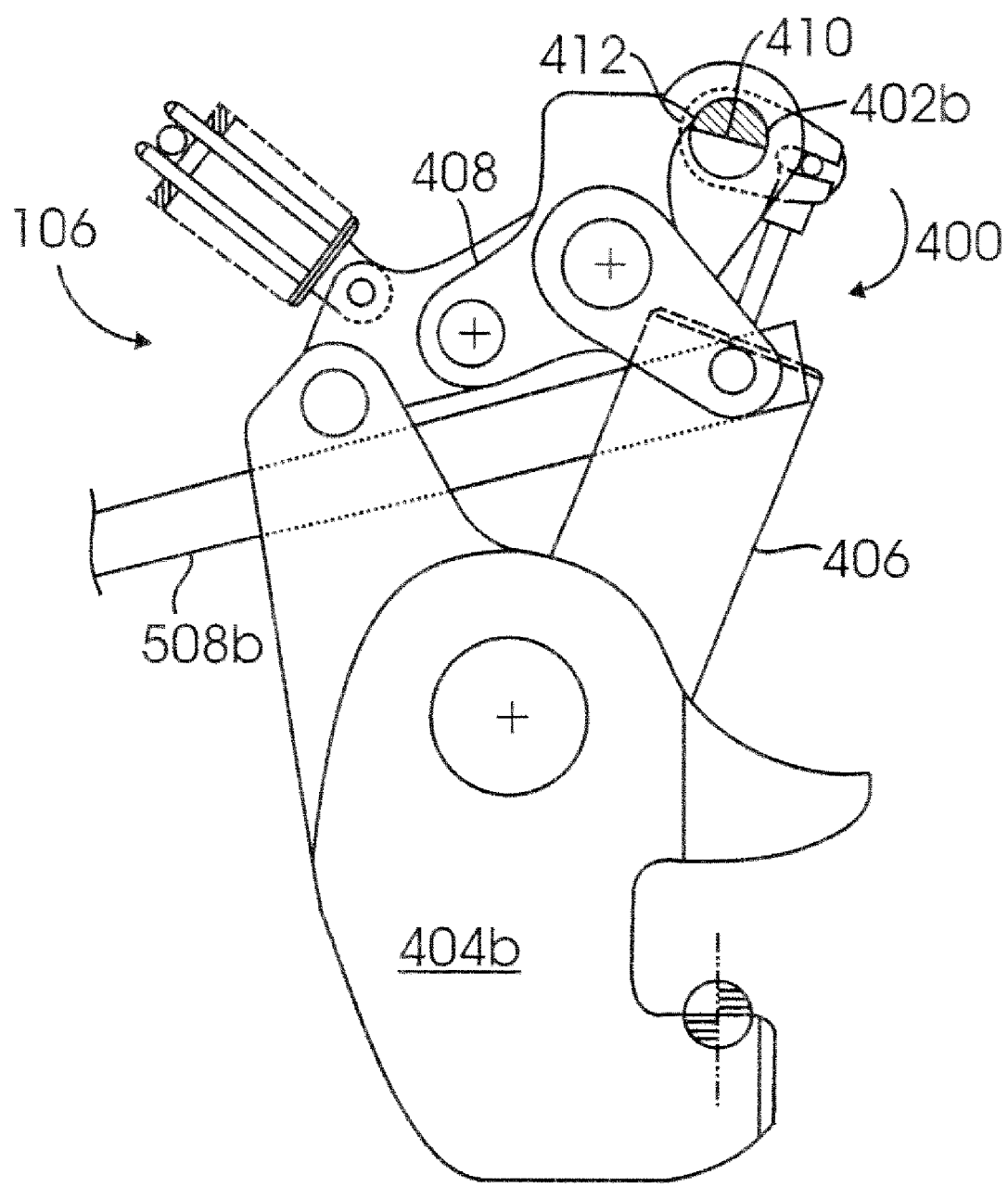
FIGS. 4A, 4B and 4C are simplified illustrations of a Safety Lock/Unlock mechanism in accordance with an embodiment of the present invention.
Figure 4B:
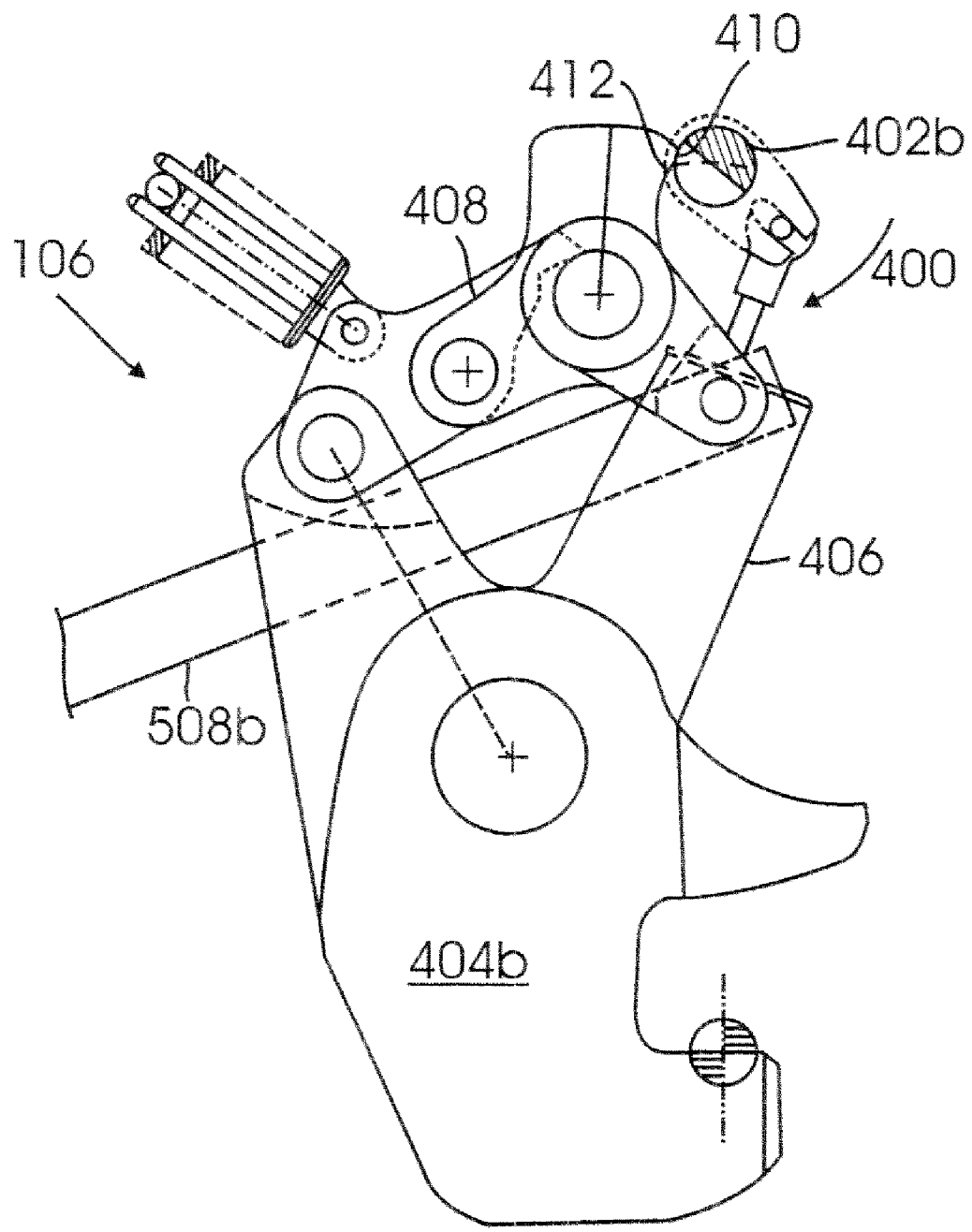
Figure 4C:
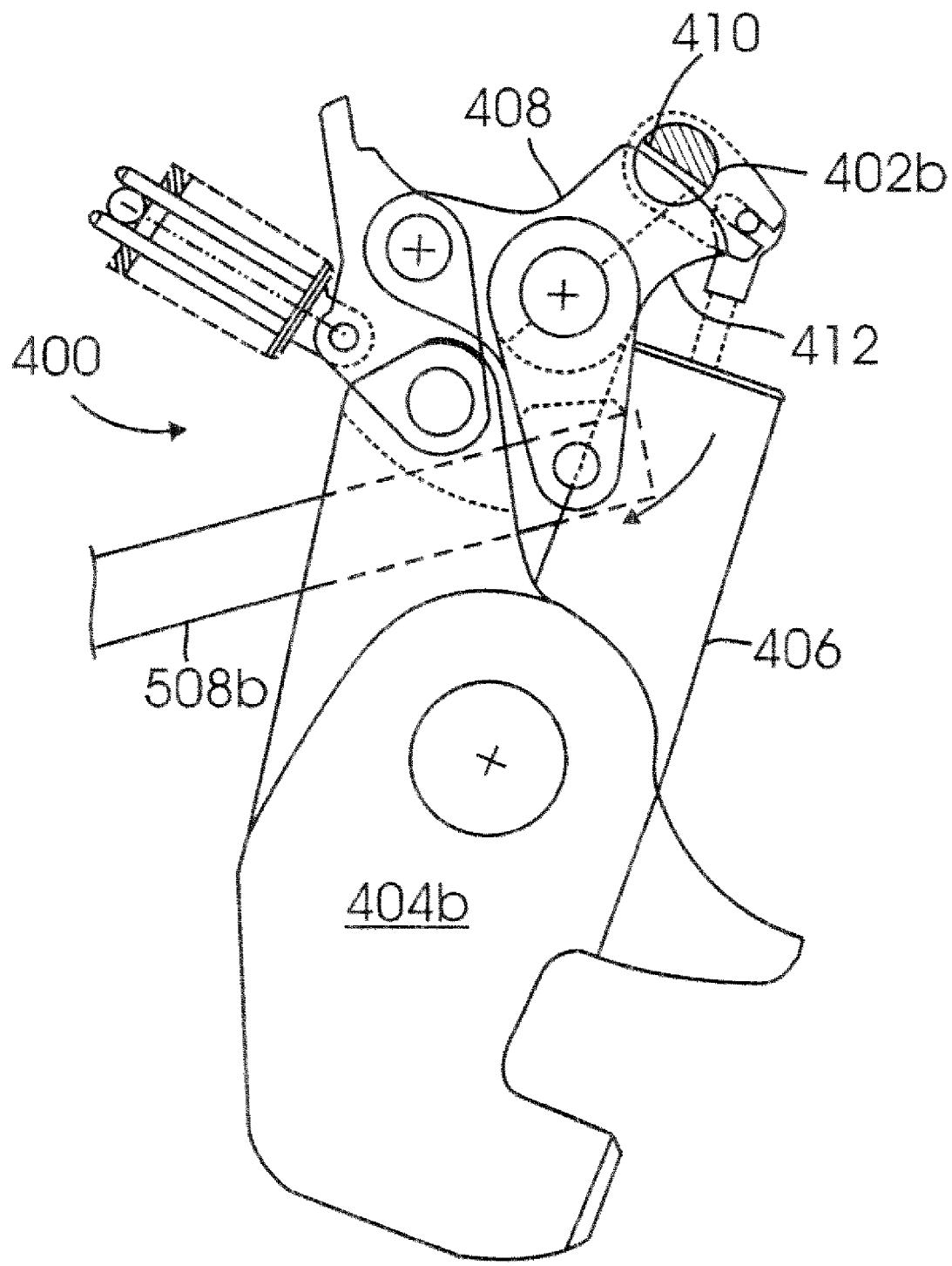

Referring now to FIGS. 4A, 4B and 4C, safety lock mechanism 106 is shown, including a Safety Lock/Unlock mechanism 400, suspension hooks 404a and 404b, and hook over-center latching system 408 (FIG. 1) in accordance with an embodiment of the present invention. Both suspension hooks 404a and 404b and hook over-center latching system 408 are conventional mechanisms, the operations of which are well known to those of ordinary skill in the art. All reference to and description of suspension hook 404b applies equally to suspension hook 404a, which operates and functions in primarily the same manner.

As shown in FIG. 4A, Safety Lock/Unlock mechanism 400 further includes, safety shaft 402, and an electro-mechanical actuator 406, which may be a solenoid or a motor, used to rotate safety shaft 402 to either a safety lock position or a safety unlock position.

In one embodiment (as illustrated in FIG. 1), separate safety shafts 402a and 402b are designed to engage with separate hook over-center latching systems 408 (not shown forward in FIG. 1) and forward suspension hook 404a and aft suspension hook 404b, respectively, to ensure that safety shafts 402a and 402b lock only the suspension hook that it is made to engage, Although separate safety shafts 402a and 402b have been referenced, it should be understood that the description of safety shaft 402 applies to both safety shafts 402a and 402b.

In operation, referring again to FIGS. 4A, 4B and 4C, electro-mechanical actuator 406 is operated to provide a rotational movement to safety shaft 402. When rotated to a first position as shown in FIG. 4A, a feature 410 of safety shaft 402 engages a feature 412 of hook overcenter latching system 408 to block movement of hook over-center latching system 408 and thus prevent the opening of suspension hook 404b.

Upon further rotation of safety shaft 402 to a second position as shown in FIG. 4B, feature 412 from hook over-center mechanism 408 disengages from feature 410 of safety shaft 402 allowing hook over-center mechanism 408 to rotate. Accordingly, free rotation of hook over-center mechanism 408 allows suspension hook 404b to open as shown in FIG. 4C.

Prior systems typically use a "manual release" system to offload a store 110. This is typically done when an aircraft returns from a mission and store 110 has not been ejected or used over a target. Prior systems use a manual method to release the suspension hooks, which requires physical access to the rack.

The present invention provides a release system 500, shown in FIG. 1, where access to ejector rack 100 is not required. The following exemplary embodiment of release system 500 is described as if Safety Lock/Unlock mechanism 400 is in the second position (as shown in FIG. 4B) as to allow the opening of suspension hooks 404a and 404b. It should be understood that release system 500 may be used with ejector rack 100 whether or not Lock/Unlock mechanism 400 is a part of the ejector system.

Release system 500 operates to release both forward suspension hook 404a and aft suspension hook 404b (FIG. 1). Thus, for clarity, FIG. 5A provides an illustration of the components used to release forward suspension hook 404a (hereafter forward release system 500a) and FIG. 5B provides an illustration of the components used to release aft suspension hook 404b (hereafter aft release system 500b).

As shown in FIG. 5A, in one embodiment, forward release system 500*a* includes hook opening striker crank 504, linear actuator 506, hook opening link 508*a* and hook opening crank 510.

In operation, hook opening striker crank 504 is coupled to shaft 502, using for example, pin 512. Retraction of linear actuator 506 imparts rotation into shaft 502 causing hook opening striker crank 504 to rotate. As hook opening striker crank 504 rotates, a feature 516 on hook opening striker crank 504 contacts boss 514 on hook opening crank 510 and forces hook opening crank 510 to rotate. When hook opening crank 510 rotates it drives hook opening link 508*a*. Hook opening link 508*a* is coupled to over-center latching system 408 (see FIG. 1) and thus movement of hook opening link 508*a* rotates over-center latching system 408 resulting in the opening of suspension hook 404*a*.

Figure 5B:
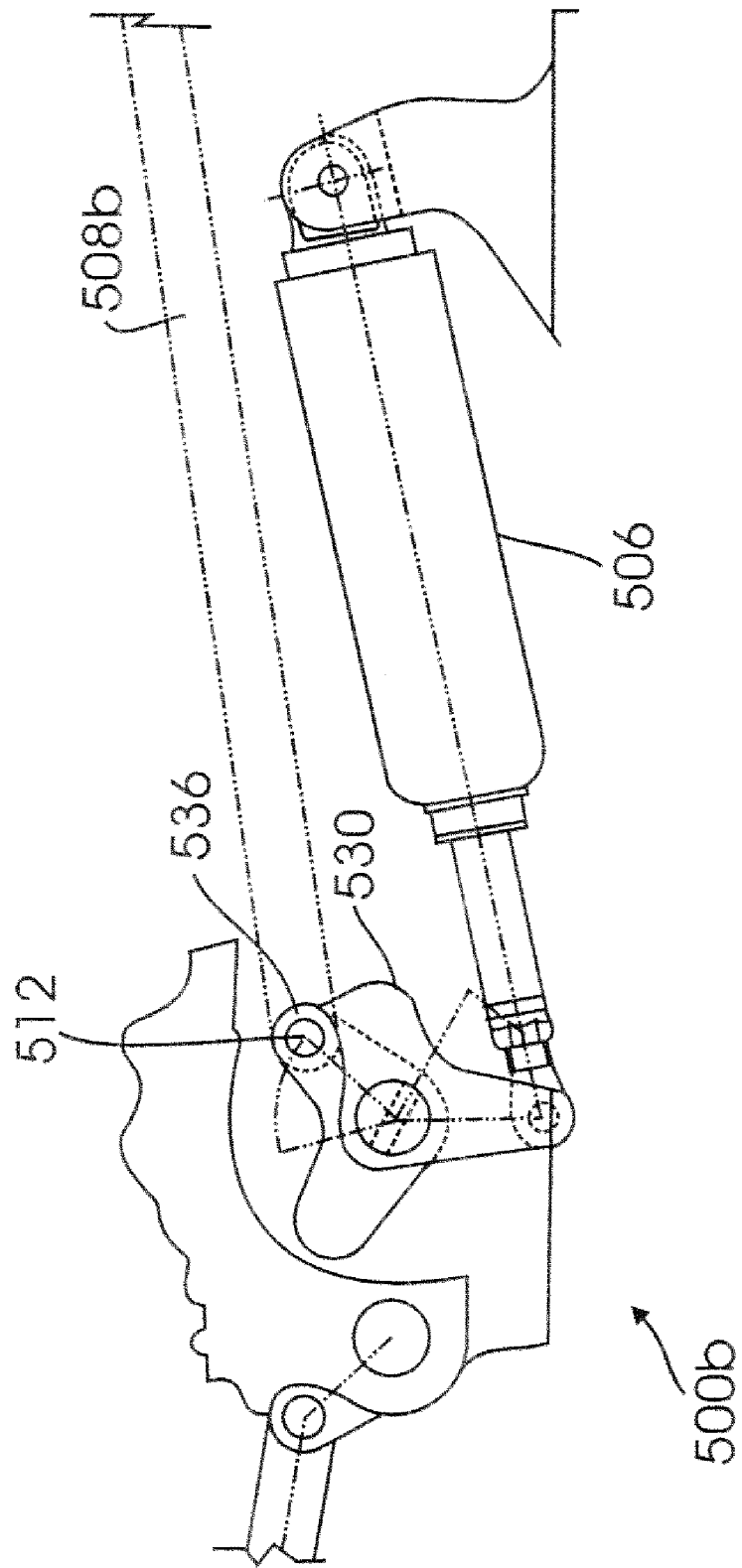

As shown in FIG. 5B, in another embodiment, aft release system 500*b*, includes hook opening striker crank 530, hook opening link 508*b*, and hook opening crank 536, used with linear actuator 506.

In operation, retraction of linear actuator 506 imparts rotation into hook opening striker crank 530 causing a feature on hook opening striker crank 530 to make contact with linkage pin 512 and impart rotation into hook opening striker crank 530. When hook opening striker crank 530 rotates it moves hook opening link 508*b*. Hook opening link 508*b* is coupled to over-center latching system 408 (see FIG. 1) and thus movement of hook opening link 508*b* rotates over-center latching system 408 resulting, in the opening of suspension hook 404*b*.

Generally, the electro-mechanical actuators described above as used in the present invention are commanded to function by electrical switch logic from a remote panel. As shown in FIGS. 6A-6D, remote panel 602 may be a combination of switches, indicators and logic that may be used to drive and operate the various actuated mechanisms associated with ejector rack 100. Remote panel 602 may be located in any convenient location on the aircraft and wired to the electro-mechanical actuators. Alternatively, remote panel 602 may be portable and have mating connectors which allow remote panel 602 to be plugged in to ejector rack 100 being loaded at any convenient location. Remote panel 602 may also be wireless and use wireless technology.

Figure 6A:
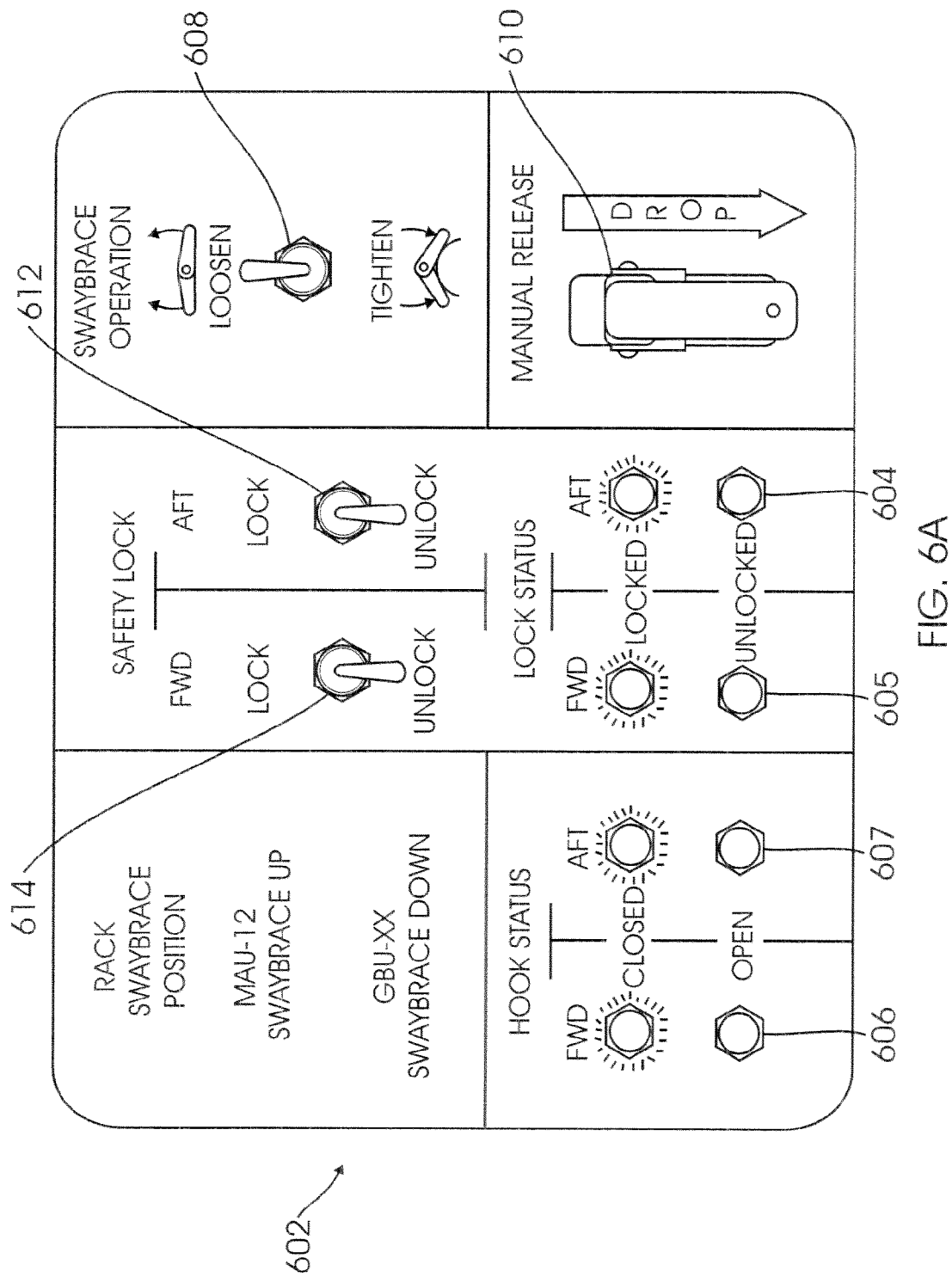
FIGS. 6A-6D are exemplary illustrations of a remote control panel in accordance with an embodiment of the present invention.

In one exemplary embodiment, shown in FIG. 6A, remote panel 602 includes lock status lights 604, forward lock status indicator light 605, aft hook status indicator lights 607, forward hook status indicator lights 606, aft safety lock control switch 612, forward safety lock control switch 614, sway brace operation/tighten control switch 608 and manual release switch 610.

FIG. 6A depicts remote panel 602 configuration as store 110 is hoisted to couple to ejector rack 100 (FIG. 1). Aft lock status indicator lights 604 and forward lock status indicator lights 605 indicate unlocked while aft hook status indicator lights 607 and forward hook status indicator lights 606 indicate open. Aft safety lock control switch 612 and forward safety lock control switch 614 are in the unlocked position. Swaybrace operation loosen/tighten control switch 608 is in the loosen position. Manual release switch 610 is in the closed position.

Figure 6B:
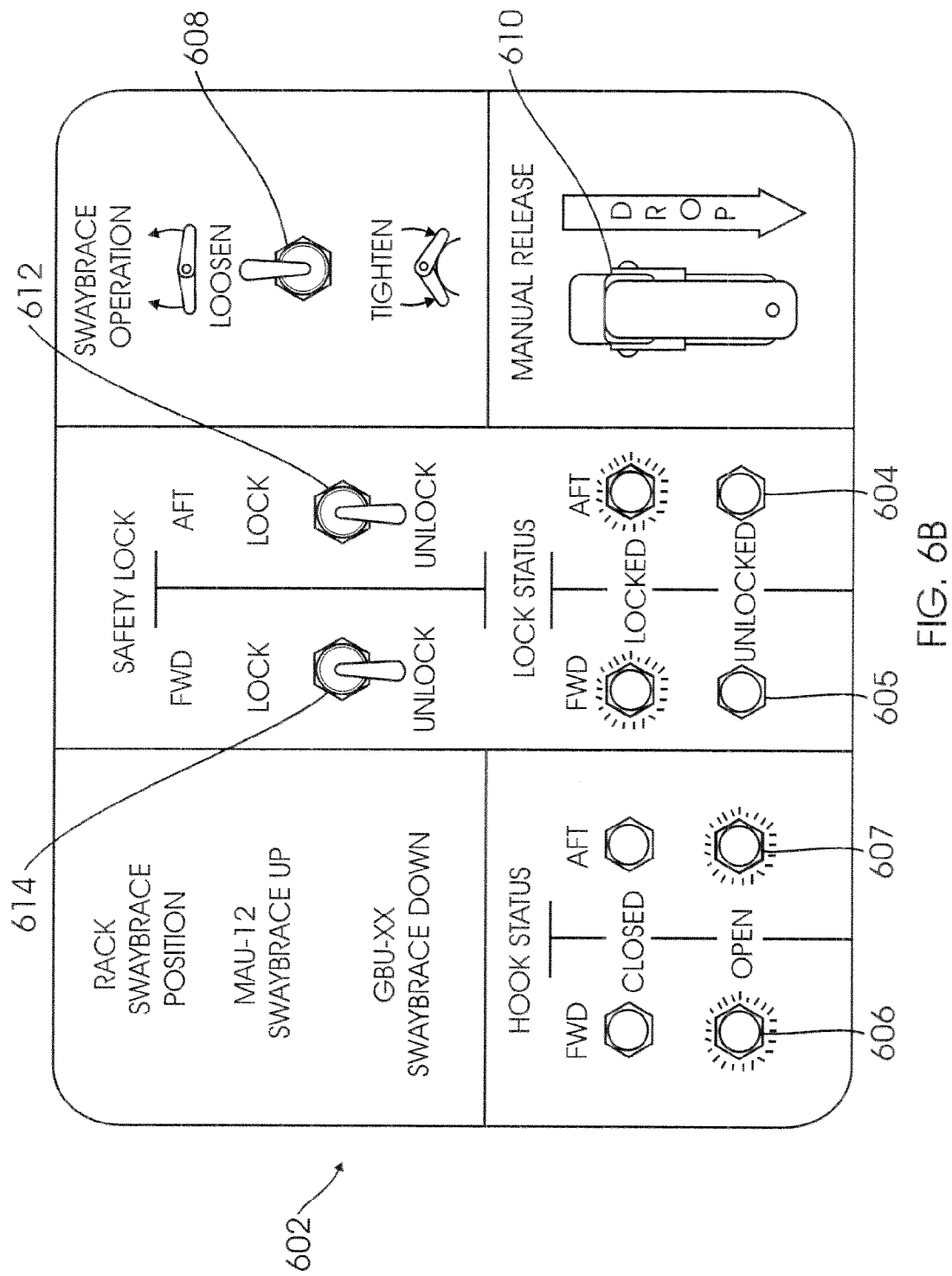

FIG. 6B depicts remote panel 602 configuration as forward and aft suspension hooks 404*a* and 404*b* of ejector rack 100 engage complimentary attachment feature 330 of store 110 (FIG. 1). Forward and aft suspension hooks 404*a* and 404*b* are closed. Aft lock status indicator lights 604 and forward lock status indicator lights 605 indicate unlocked. Aft hook status indicator lights 607 and forward hook status indicator lights 606 indicate closed. Aft safety lock control switch 612 and forward lock control switch 614 are in the unlocked position. Swaybrace operation loosen/tighten control switch 608 is in the loosen position. Manual release switch 610 is in the closed position.

Figure 6C:
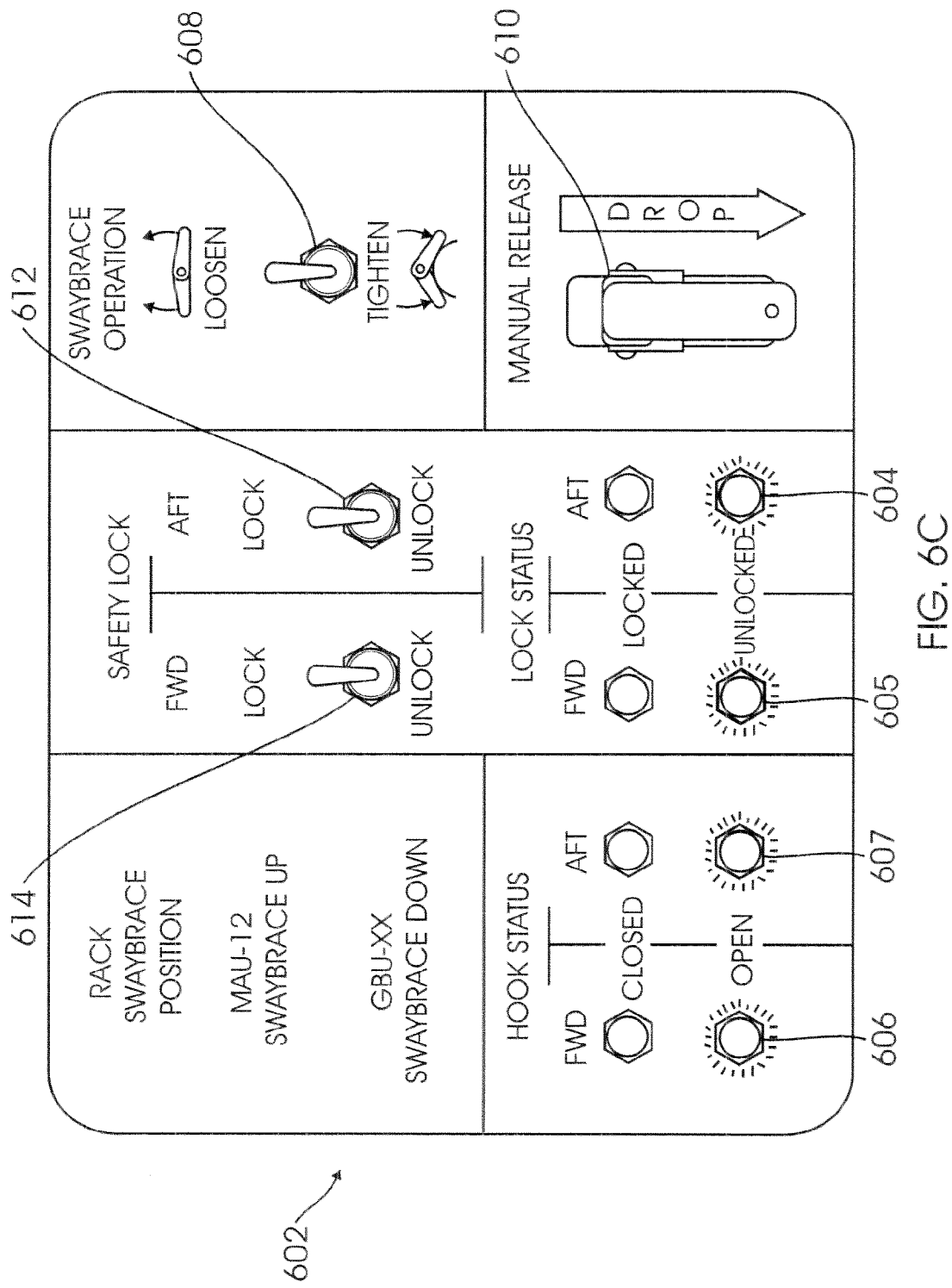

FIG. 6C depicts remote panel 602 configuration as forward and aft suspension hooks 404*a* and 404*b* are locked (FIGS. 4*a*, 4*b* and 4*c*). Aft lock status indicator lights 604 and forward lock status indicator lights 605 indicate closed. Aft hook status indicator lights 607 and forward hook status indicator lights 606 indicate closed. Aft safety lock control switch 612 and forward safety lock control switch 614 are in the locked position. Swaybrace operation loosen/tighten control switch 614 are in the locked position. Manual release switch 610 is in the closed position.

Figure 6D:
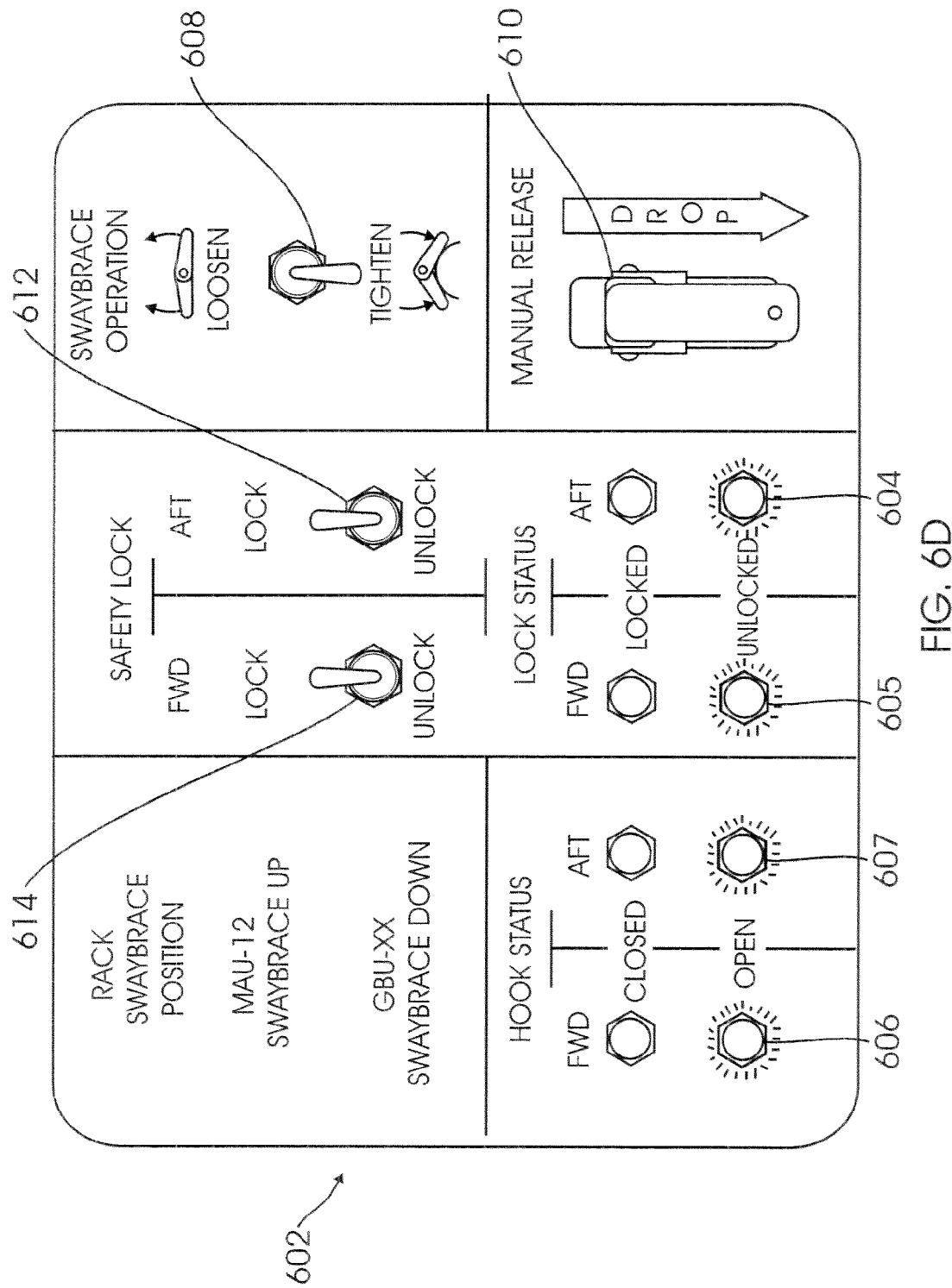

FIG. 6D depicts remote panel 602 configuration as an operator engages the swaybrace structure 102*a* (FIGS. 1, 2*a*, 2*b* and 3). Aft lock status indicator lights 604 and forward hook status indicator lights 606 indicate closed. Aft safety lock control switch 612 and forward safety lock control switch 614 are in the locked position. Swaybrace operation loosen/tighten control switch 608 is in the tighten position. Manual release switch 610 is in the closed position.

Typically, visual inspection of forward and aft suspension hooks 404*a* and 404*b* is made to determine if suspension hooks 404*a* and 404*b* have closed. As visual inspection may not be possible with certain stores, the present invention provides independent Safety Lock/Unlock mechanisms 400 at each suspension hook. Referring to FIG. 4A, Safety Lock/Unlock mechanism 400 is configured such that safety shaft 402 can only be placed to "locked" or "safe" position when suspension hook 404*b* is fully closed. That is, feature 41 of safety shaft 402 ca only be engaged with feature 412 of hook over-center latching system 408 if suspension hook 404*b* is fully closed. Accordingly, this configuration provides a means to determine if suspension hook 404*b* is closed absent the ability to make a visual inspection It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A stores ejector rack comprising:
   an adjustable swaybrace structure including a first swaybrace arm and a second swaybrace arm each extending substantially perpendicular to a centerline of the adjustable swaybrace structure, a plurality of tightening screws disposed on each of the swaybrace arms to position a store and counter movements of the store while mounted to the adjustable swaybrace structure;
   a first suspension hook and a second suspension hook for releasably retaining the store, the first and second suspension hooks coupled to linear actuators which operate to open and close the first and second suspension hooks;
   a first electro-mechanical actuator coupled to a first threaded member, wherein movement of the first threaded member causes the first swaybrace arm to move vertical between a store free hanging position where the store is not in contact with the plurality of tightening screws and the first and second suspension hooks are open and a store secure position where the store is in contact with the plurality of tightening screws and the first and second suspension hooks are closed to secure the store; and a second electro-mechanical actuator coupled to a second threaded member, wherein movement of the second threaded member causes the second swaybrace arm to move vertically and independently from the first swaybrace arm between a store free hanging position where the store is not in contact with the plurality of tightening screws and the first and second suspension hooks are open and a store secure position where the store is in contact with the plurality of tightening screws and the first and second suspension hooks are closed to secure the store, and wherein the first and second electro-mechanical actuators and the linear actuators are commanded to function by electrical switch logic from a remote panel.

2. A stores ejector rack as in claim 1, further comprising a pneumatic ejection system to provide a source of energy for forcible ejection of the store including an on-board source of pressurized non-pyrotechnic gas and a transfer mechanism.

3. A stores ejector rack as in claim 1, wherein said adjustable swaybrace structure comprises a swaybrace down stop to limit the extent of said free hanging position.

4. A stores ejector rack as in claim 1, wherein said plurality of tightening screws each comprises a mounting pad that is configured to swivel to allow the mounting pad to sit substantially flush on the store.

5. A stores ejection system comprising:
   a first adjustable swaybrace arm configured to be moved between a store free hanging position and a store secure position, and including a plurality of tightening screws for containing movement of a store;
   a second adjustable swaybrace arm configured to be moved between a store free hanging position and a store secure position, and including a plurality of tightening screws for containing movement of the store;
   a first threaded member driven by a first electro-mechanical actuator to cause the first adjustable swaybrace arm to move between the store free hanging position and the store secure position;
   a second threaded member driven by a second electro-mechanical actuator to cause the second adjustable swaybrace arm to move independently from the first adjustable swaybrace member between the store free hanging position and the store secure position; and
   a first and a second suspension hook coupled to a suspension hook opening system including a plurality of linking members driven by first and second linear actuators, wherein the linear actuators move at least one of the first and second suspension hooks between an open position and a closed position to secure the store, and
   wherein the first and second electro-mechanical actuators are commanded to function by electrical switch logic from a remote panel.

6. A stores ejector rack as in claim 5, wherein said plurality of tightening screws are positioned at an angle relative to a centerline of said ejection system.

7. A stores ejector rack as in claim 5, wherein said plurality of tightening screws each comprise a mounting pad that is configured to swivel to allow the mounting pad to sit substantially flush on the store.

8. A stores ejector rack as in claim 5, wherein said suspension hook opening system comprises a safety lock mechanism that provides an indication that the at least one of the first and second suspension hooks is in a closed position.

9. A method for releasing a store from a store ejector rack for the purpose of ground store removal, said method comprising:
   moving a first swaybrace arm vertically between a store secure position where the store is in contact with a plurality of tightening screws disposed on the swaybrace arm and a free hanging position where the store is not in contact with the plurality of tightening screws using first electro-mechanical actuation device;
   moving a second swaybrace arm vertically and independently from the first swaybrace arm between a store secure position where the store is in contact with a plurality of tightening screws disposed on the second swaybrace arm and a free hanging position where the store is not in contact with the plurality of tightening screws using a second electro-mechanical actuation device;
   adjusting a plurality of linking members to open a first suspension hook and a second suspension hook used to release said store using at least one linear actuation device: and
   controlling the first and second electro-mechanical actuation devices by electrical switch logic from a remote panel.

10. The method as in claim 9, wherein said first and second electro-mechanical actuation devices each drive a threaded member moving said first swaybrace arm and said second swaybrace arm between said free hanging position and said store secure position.

* * * * *

UNITED STATES PATENT AND TRADEMARK OFFICE
CERTIFICATE OF CORRECTION

| | |
|---|---|
| PATENT NO. | : 7,648,104 B1 |
| APPLICATION NO. | : 11/453413 |
| DATED | : January 19, 2010 |
| INVENTOR(S) | : Jakubowski, Jr. et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 499 days.

Signed and Sealed this

Sixteenth Day of November, 2010

David J. Kappos
*Director of the United States Patent and Trademark Office*